United States Patent Office 3,496,358
Patented Feb. 17, 1970

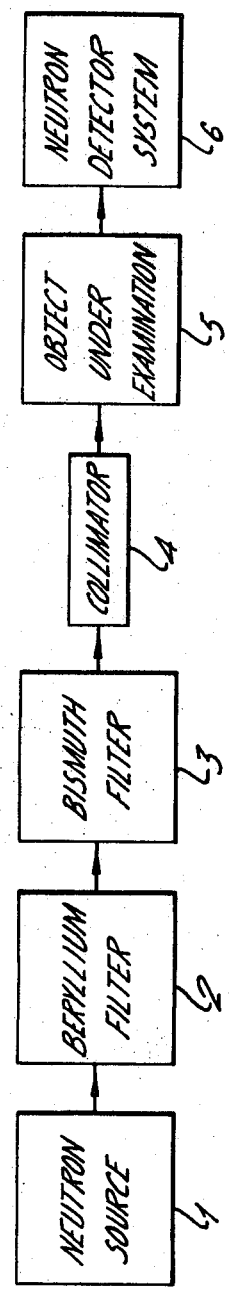

3,496,358
RADIOGRAPHIC EXAMINATION OF IRON-CONTAINING OBJECTS USING SUBTHERMAL NEUTRONS
John Penrose Barton, Grenoble, France, assignor to United Kingdom Atomic Energy Authority, London, England
Filed May 6, 1966, Ser. No. 548,296
Claims priority, application Great Britain, May 13, 1965, 20,201/65
Int. Cl. G01t 3/00; H01j 39/32, 39/00
U.S. Cl. 250—83.1                         4 Claims

ABSTRACT OF THE DISCLOSURE

An object, the predominant metal of which is iron, is radiographically examined with subthermal neutrons by forming a beam of neutrons having an energy less than the energy at which there is cut-off of the coherent scattering effect on neutrons in iron, directing that beam of neutrons at the object to be examined, and detecting the neutrons which pass through that object. In this manner, iron containing objects having a thick cross section, can be effectively radiographically examined.

---

This invention relates to methods of radiographic examination using neutrons.

The term "radiographic examination" is generally used to means a method of examining microscopic objects by passing X or gamma radiation through them. In this specification the term "radiographic examination using neutrons" means a technique which is similar to radiographic examination but uses neutrons in place of X or gamma radiation.

There are several general advantages in radiographic examination using neutrons as compared with radiographic examination using X or gamma radiation. One is that of being able to locate small quantities of hydrogenous materials within metals. This means that such things as adhesives and electrical insulation within a metal object can be inspected. In addition, hydrogenous liquids can be used to show the shape of internal cavities, and where the liquid is a penetrating oil, can be used to show the location and extent of defects such as cracks.

The most widely used metal is iron, in one form or another, and it is unfortunate that radiographic examination of large thicknesses of iron using thermal neutrons is not particularly successful.

An object of the present invention is to provide an improved method of radiographically examining metal objects using neutrons, where the predominant metal in the objects is iron.

According to the present invention, a method of radiographic examination of a metal object using neutrons, the predominant metal in the object being iron, comprises directing a beam of neutrons at the object, the energy of the neutrons being below the cut-off of the coherent scattering effect for iron, and supplying the neutrons which pass through the object to a neutron detection system.

The neutrons used are therefore sub-thermal or cold neutrons, having energies of less than 0.005 electron volt.

The method has particular, but not exclusive, application to the case where the object under examination has some hydrogenous material within it.

With this method superior radiographic penetration and sensitivity can be achieved. The full explanation for this effect is not understood, but evidently results from a significantly reduced scattering factor in addition to the obviously higher attenuation for the hydrogen present and the lower attenuation for iron.

A method of radiographic examination using neutrons, the method being in accordance with the present invention will now be described by way of example with reference to the accompanying drawing, which shows in block schematic form apparatus for performing the method.

The particular method to be described is one which has been used to inspect steel objects up to four inches thick and having within them some hydrogenous material.

Referring now to the drawing, the apparatus comprises a neutron source 1 which in this particular case is a nuclear reactor, although other suitable neutron sources could be used. The emergent beam of neutrons is passed through a beryllium filter 2 formed by eight inches of polycrystalline beryllium, a bismuth filter 3, formed by a single crystal of bismuth four inches thick, and a collimator 4, before being directed at the object 5 to be examined. Beryllium has a sharp cut-off in the scattering cross-section for neutrons of energy 0.005 electron volt, so the filtered beam comprises neutrons of lower energy than this. The efficiency of the beryllium filter 2 is improved by cooling with liquid nitrogen, and the very low absorption cross-section of beryllium enables a strong beam of neutrons of energies below 0.005 electron volt to be obtained. The purpose of the filter 3 is to filter gamma radiation from the beam. Bismuth is a suitable material because it has a high density coupled with a low neutron absorption. The crystal is orientated such that it does not scatter neutrons of about 0.005 electron volt from the beam.

The neutrons passing through the object 5 are supplied to a neutron detector system 6 to make neutron photographs. The detector system 6 comprises a lithium-6 loaded zinc sulphide scintillator screen supplied by Nuclear Enterprises (G.B.) Ltd., in conjunction with Ilford H.P. 3 film.

Neutron photographs obtained with this apparatus show good resolution and good contrast between the hydrogenous material within the steel and the steel itself. In one particular experiment the object 5 was a steel wedge of maximum thickness four inches having a thin strip of polythene behind it. The neutron photographs obtained showed the polythene strip clearly over the whole length of the wedge. On repeating the experiment with a beam of thermal neutrons the polythene strip was found not to be visible through more than about two inches of steel.

A further advantage following from the use of low energy neutrons is the low scattering factor of the steel of the object 5. This may be due to the reduced scattering cross-section or to the self-filtering action which results from the energy gain of scattered neutrons, but as stated above this effect is not fully understood.

I claim:
1. A method using neutrons for radiographic examination of objects, the predominant metal of which is iron, which method comprises forming a beam of sub-thermal neutrons of energy less 0.005 electron volt than the energy at which these is cut-off of the coherent scattering effect on neutrons in iron, directing the beam of neutrons at said object, and detecting the neutrons which pass through said object.

2. A method according to claim 1, wherein the step of forming said beam of neutrons comprises forming an initial beam of neutrons including neutrons with energy in excess of 0.005 electron volt and neutrons with energy less than 0.005 electron volt, and filtering the initial beam of neutrons by passing the neutrons through beryllium, to remove neutrons with energy in excess of 0.005 electron volt.

3. A method according to claim 2, wherein said initial beam of neutrons is formed in a nuclear reactor.

4. A method according to claim 3, wherein said beam of neutrons passing through said beryllium filter is passed through a bismuth filter comprising a single crystal of bismuth orientated for minimum scatter of neutrons of energy about 0.005 electron volt to filter gamma radiation from said beam.

References Cited

UNITED STATES PATENTS 3,237,009  2/1966  Warman et al. _____ 250—83.1

ARCHIE R. BORCHELT, Primary Examiner

U.S. Cl. X.R.

250—83